US010430445B2

(12) United States Patent
Crouch et al.

(10) Patent No.: US 10,430,445 B2
(45) Date of Patent: Oct. 1, 2019

(54) TEXT INDEXING AND PASSAGE RETRIEVAL

(71) Applicant: Nuance Communications, Inc., Burlington, MA (US)

(72) Inventors: Richard S. Crouch, Cupertino, CA (US); Marisa F. Boston, Saline, MI (US); Ali Erdem Ozcan, Montreal (CA); Peter R. Stubley, Lachine (CA)

(73) Assignee: Nuance Communications, Inc., Burlington, MA (US)

(*) Notice: Subject to any disclaimer, the term of this patent is extended or adjusted under 35 U.S.C. 154(b) by 462 days.

(21) Appl. No.: 14/485,176

(22) Filed: Sep. 12, 2014

(65) Prior Publication Data

US 2016/0078102 A1 Mar. 17, 2016

(51) Int. Cl.
*G06F 16/31* (2019.01)
(52) U.S. Cl.
CPC ................. *G06F 16/313* (2019.01)
(58) Field of Classification Search
CPC ....................................................... G06F 16/313
See application file for complete search history.

(56) References Cited

U.S. PATENT DOCUMENTS

| | | | | |
|---|---|---|---|---|
| 9,031,961 B1* | 5/2015 | Cabanero | .......... | G06F 17/30386 704/200 |
| 9,514,113 B1* | 12/2016 | Shaw | .......... | G06F 17/241 |
| 2004/0243645 A1* | 12/2004 | Broder | .......... | G06F 17/30616 |
| 2007/0073533 A1* | 3/2007 | Thione | .......... | G06F 17/279 704/9 |
| 2007/0136280 A1* | 6/2007 | Li | .......... | G06F 17/30616 |
| 2009/0070322 A1* | 3/2009 | Salvetti | .......... | G06F 17/30616 |
| 2012/0078926 A1* | 3/2012 | Chu-Carroll | .......... | G06N 5/02 707/755 |
| 2012/0265528 A1* | 10/2012 | Gruber | .......... | G10L 15/18 704/235 |
| 2013/0054589 A1* | 2/2013 | Cheslow | .......... | G06F 17/30401 707/728 |
| 2013/0304742 A1* | 11/2013 | Roman | .......... | G06F 17/30598 707/740 |
| 2013/0332162 A1* | 12/2013 | Keen | .......... | G10L 15/26 704/235 |
| 2014/0025706 A1* | 1/2014 | Barve | .......... | G06F 17/30522 707/771 |

(Continued)

*Primary Examiner* — Kris E Mackes
*Assistant Examiner* — Lin Lin M Htay
(74) *Attorney, Agent, or Firm* — Brian J. Colandreo; Michael T. Abramson; Holland & Knight LLP

(57) ABSTRACT

Methods and systems for indexing document passages are presented. In some embodiments, a computing device may identify a plurality of documents that comprise a plurality of passages. A passage index comprising a plurality of entries may be generated. Each entry may comprise keywords from a passage of the plurality of passages in one of the plurality of documents. Each entry may further comprise at least one annotation associated with the passage. A search query comprising at least one search keyword may be received. The passage index for each document of the plurality of documents may be analyzed using the at least one search keyword to identify at least one passage from the plurality of documents that matches the search query. In response to the query, the at least one passage may be presented.

20 Claims, 7 Drawing Sheets

(56) References Cited

U.S. PATENT DOCUMENTS

| | | | |
|---|---|---|---|
| 2014/0316764 A1* | 10/2014 | Ayan | G10L 15/24 704/9 |
| 2015/0317313 A1* | 11/2015 | Lv | G06F 17/3053 707/730 |
| 2016/0055234 A1* | 2/2016 | Visotski | G06F 17/30719 707/728 |

* cited by examiner

400 infections 281 C0021311 $payload$ 1.999999 T038 $payload$ 1.999999

*Cuis and Tuis* associated with word "infections" starting at character 281.

Payload is a combination of span length of CUI before the decimal point, and confidence after the decimal point abnormal $payload$ 0   cervical $payload$ 0   dysplasia $payload$ 0

Additional tokens from title document, providing passage context

C2347472 $payload$ 0.9080989    T081 $payload$ 0.9080989

C0523444 $payload$ 0.999999 T051 $payload$ 0.999999

*Cuis and Tuis* for title terms (note zero length spans)

main $payload$ 0 topic $payload$ 0 basics $payload$ 0 description $payload$ 0 MAIN TOPIC>>BASICS>>DESCRIPTION>>

Further terms from section heading

_stce_ _ fb_

Mark sentence and fragment boundaries

*FIG. 4*

TEXT INDEXING AND PASSAGE RETRIEVAL

FIELD

Aspects described herein relate to computer indexing and searching, and more specifically, to indexing and searching for passages within documents in response to a natural language question.

BACKGROUND

With advances in natural language processing (NLP), there is an increasing demand to integrate NLP techniques to improve question answering systems. Current techniques for computerized question answering rely on document retrieval search engines to retrieve documents that may contain information related to a question asked to the QA system. Conventional search engines return one caption or snippet per retrieved document in the search result. However, these resulting snippets from the retrieved documents merely provide users a quick impression of whether the whether a document is likely to be relevant to their information request. The user often needs to open the document and read it to gather the required information to determine whether the document is able to answer the actual question asked, or whether it simply contains similar terminology.

Because relevant terms and information are often scattered across different parts of documents, search result captions from conventional document search engines are often fragmentary, and difficult to interpret unambiguously without additional context. Conventional search engines pull together these scattered snippets of information as best they can into a single piece of caption text, at the cost of the text often not being particularly well formed language, and being unclear about whether scattered terms really stand in a meaningful relationship to one another. Accordingly, current QA systems and search engines fail to extract and present, as search results, self-contained and well-formed passages from documents which are clear about the relation between the passage and relevant parts of the document and that contain the information necessary to answer the user's question.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Various aspects of the disclosure provide more efficient, effective, functional, and convenient ways of performing a document passage search. In particular, in one or more embodiments discussed in greater detail below, passage search functionalities are implemented, and/or used in a number of different ways to provide one or more of these and/or other advantages.

In some embodiments, a computing device may identify a plurality of documents, each of which comprises a plurality of passages. The computing device may generate a passage index comprising a plurality of entries. Each entry may comprise keywords from a passage of the plurality of passages in one of the plurality of documents. Each entry may further comprise at least one annotation associated with the passage. The computing device may receive a search query comprising at least one search keyword. The computing device may analyze the passage index for the plurality of documents using the at least one search keyword to identify at least one passage from the plurality of documents that matches the search query. In response to the query, the computing device may present the at least one passage.

In some embodiments, the passage index for a document may be generated by parsing the document according to a predefined document structure parsing algorithm, to identify the plurality of passages, the keywords from the plurality of passages, and the at least one annotation. The computing device may store an association between the keywords of the passage and the at least one annotation in an entry within the passage index.

In some embodiments, the annotations in the passage index may comprise text from at least one of a document title of a document corresponding to the keyword, a section heading corresponding to the keyword, context from one of the plurality of passages located proximal to the section heading, concept identifiers related to the keyword, a synonym of the keyword, a part of speech for the keyword, syntactic dependencies of the keyword, and boundary markers in the document near the keyword.

In some embodiments, the computing device may analyze the passage index to identify a passage matching the search query by searching portions of passage indices of each of the plurality of documents for matches between an entry in the passage indices and the at least one search keyword. The computing device may score each passage of each of the plurality of documents based on a number of matches between passage index entries for a given passage and the at least one search keyword. The searching may further comprise scanning the passage indices of each of the plurality of documents using boundary markers to identify a start and an end of each passage within each document, wherein a predefined document structure parsing algorithm may provide the boundary markers.

In some embodiments, the passage index may comprise passage text from the passage. The annotations added to the passage index may be inserted at an end of a portion of the passage text. The at least one annotation may comprise text in the document located at a non-proximal location in the document relative to the keyword.

In some embodiments, one or more documents of the plurality of documents may comprise well-formed sentences. The computing device may divide each of the one or more documents comprising well-formed sentences to generate a plurality of sentence oriented documents. The computing device may keywords in one of the plurality of sentence oriented documents with annotations comprising information related to the keywords.

In some embodiments, the at least one passage may be identified to find information to respond to a prompt. The computing device may parse the prompt to generate the search query used to identify the at least one passage. The computing device may parse information from the at least one passage to respond to the prompt. The keyword from the at least one passage may be analyzed for semantic relationships to respond to the prompt.

These and additional aspects will be appreciated with the benefit of the disclosures discussed in further detail below.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIG. 4 depicts an illustrative diagram of the annotations included in a passage index used in the passage search in accordance with one or more illustrative aspects described herein.

DETAILED DESCRIPTION

Figure 1:
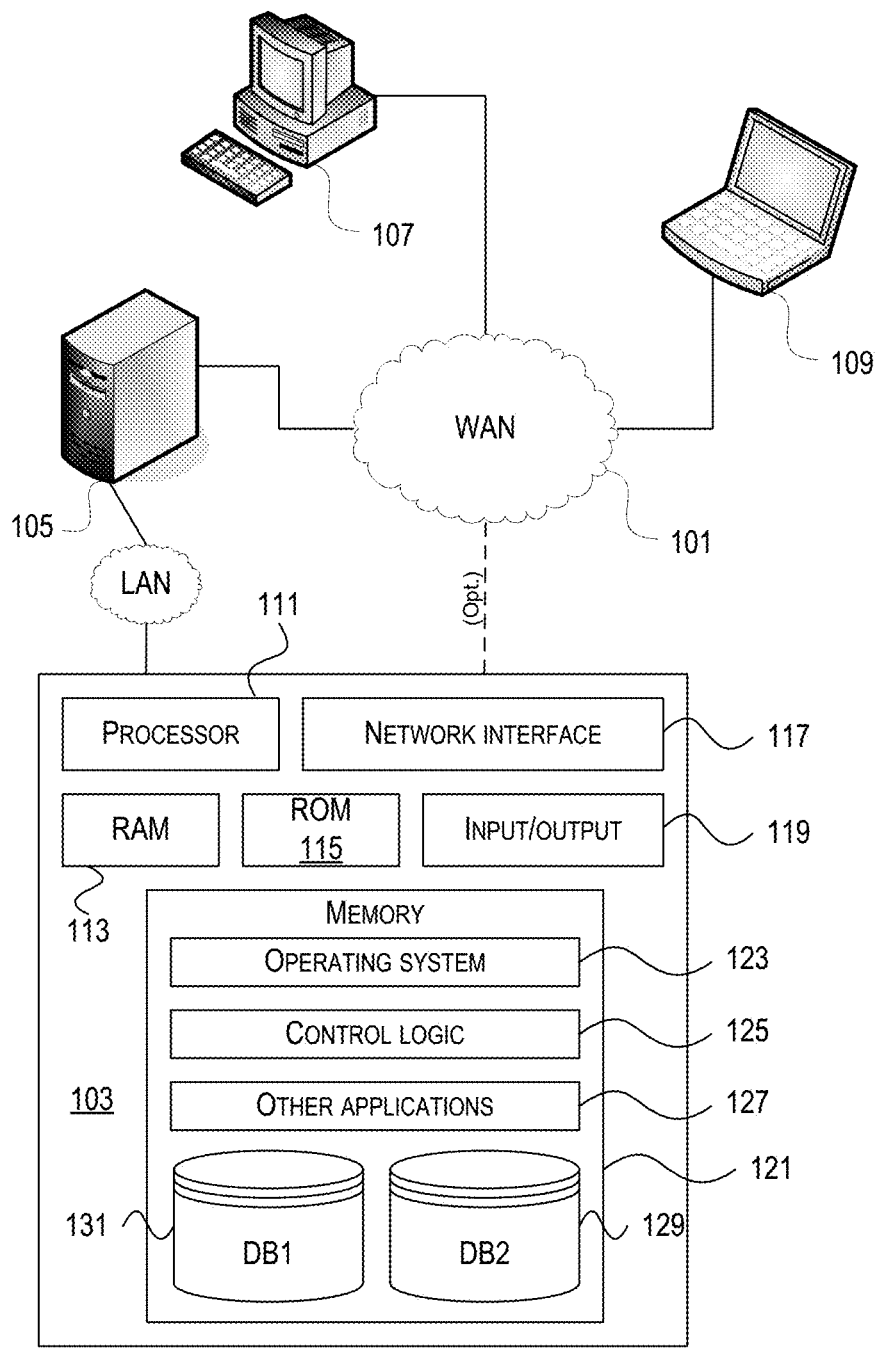
FIG. 1 depicts an illustrative computer system architecture that may be used in accordance with one or more illustrative aspects described herein.

In computerized question answering applications, answers to questions may be generated by searching a database of information, hereinafter also referred to as the knowledge base. A question may be decomposed into a search query and a search engine may search the database of information to retrieve documents relevant to the search query. However, current search engine technology is optimized for document retrieval instead of passage retrieval. Current document retrieval search engines typically return a portion or "snippet" of a retrieved document that contains the highest number of instances in which some terms from the search string appear in the retrieved document. Such portions of the retrieved paragraphs are often not the optimal portions of the document needed to answer the question. A user often has to open the retrieved document by scanning the snippet and read through the document to identify the portion he is interested in. Because document retrieval search engine technology is configured to return the document, it often misses the contextual clues that indicate which passage actually contains the information that the user is interested in.

In accordance with aspects of the disclosure, a passage retrieval system is provided, which searches for passages that extracts well-formed and self-contained passages. The passage retrieval system provides a retrieved passage by matching relationships expressed by an input question to the relationships expressed by passages supporting candidate answers to the question. Passages in retrieved documents may be scored to determine the level of match between the relationship of the question to the relationship expressed by the passage so that the passage extracted by the passage retrieval system maximizes the relationship overlap between the question and the passage.

In some embodiments, each document in the knowledge base may be parsed to contribute to an annotated passage index. The annotated index may capture contextual information for passage text in the document associated with passage text. Contextual information included in such an annotated passage index may include document titles, section headings, synonyms for passage keywords, parts of speech of passage keywords, boundary markers between different sections of a passage, syntactical dependencies of passage keywords, and semantic relationships between passage keywords. Such an annotated passage index may be searched using a search string to identify which passage is to be extracted by the passage search to be provided to the user. Passages may be scored once the passage index has been searched using a search string and the highest scoring passage may be retrieved.

Passage retrieval using an annotated passage index may result in more optimal passages being retrieved than the snippets that are retrieved by document search engines merely analyzing document text for highest number of matches against a search string. Documents retrieved by the passage retrieval process may be further processed using NLP algorithms to supplement additional annotations to the annotated passage index to provide the most optimal passage in the retrieved document to the user. Once a passage is retrieved, an answer to the originally asked question that triggered the passage retrieval process may be composed in a natural language format. The answer may be composed by examining the passage search result against the question, identifying the information from the passage that sufficiently answers the question, and presenting the identified passage information to the user upon determining the most appropriate syntactical form in which to phrase the answer.

In the following description of the various embodiments, reference is made to the accompanying drawings, which form a part hereof, and in which is shown by way of illustration various embodiments. It is to be understood that other embodiments may be utilized and structural and functional modifications may be made without departing from the scope of the present disclosure. The disclosure is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

FIG. 1 illustrates one example of a network architecture and data processing device that may be used to implement one or more illustrative aspects of the disclosure. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the disclosure as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the disclosure as described herein, and other application software 127 providing secondary, support, and/or other functionality which may or may not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Figure 2:
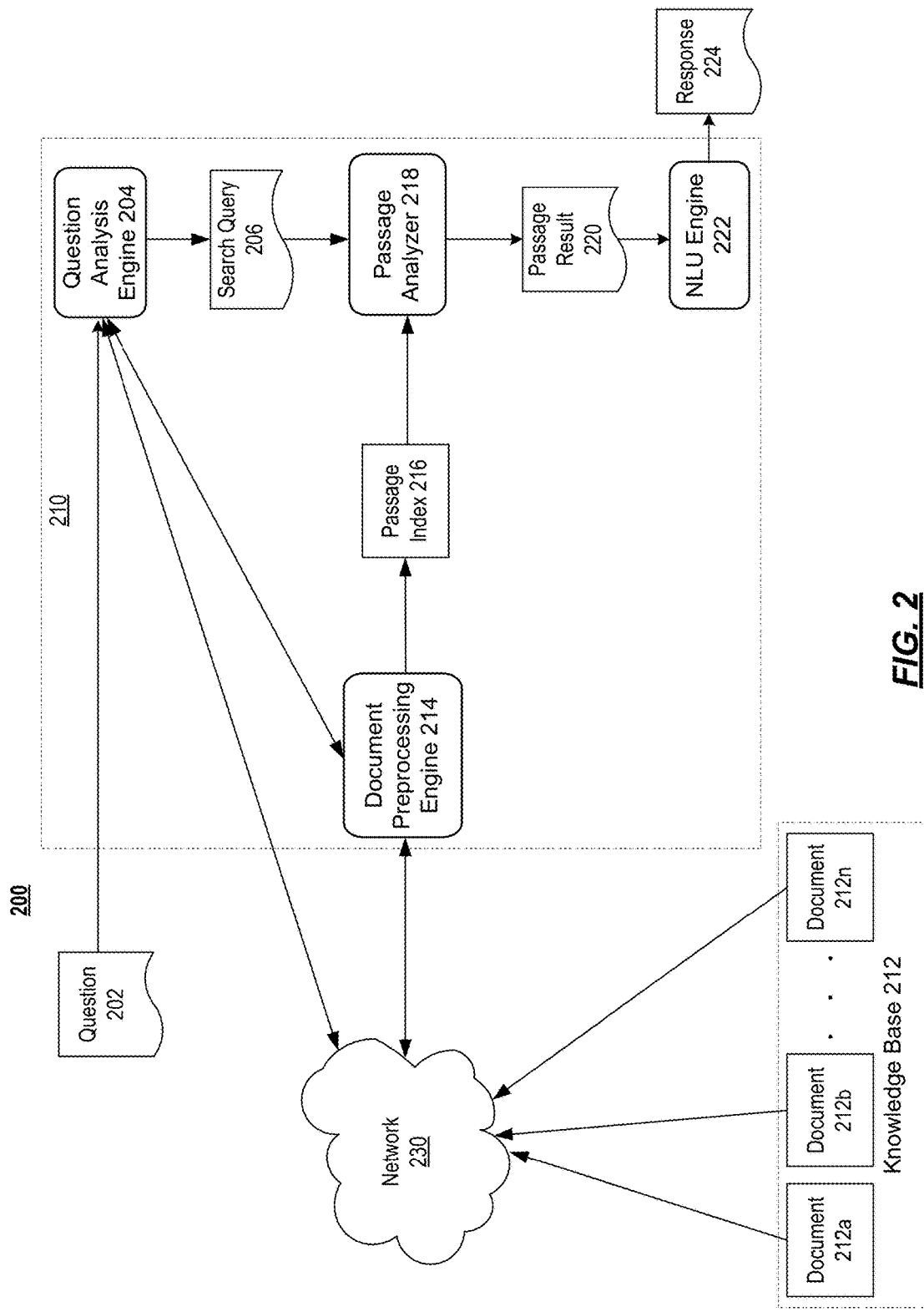
FIG. 2 depicts an illustrative block diagram of the system architecture for a question answering system that generates a response to an input question in accordance with one or more illustrative aspects described herein.

FIG. 2 depicts an illustrative block diagram of a system architecture for a question answering system 210 that generates a response to an input question in a question answering environment 200. Question analysis engine 204 may analyze question 202, input into QA system 210, and decompose question 202 into a search query 206 in a form that is more suitable to conduct an information search than that of question 202. Passage analyzer 218 may analyze a passage index 216 using search query 206 to identify which passage from a knowledge base of documents best matches search query 206. Document preprocessing engine 214 may retrieve passage text and annotation information from documents 212a, 212b, 212n (e.g., the knowledge base 212) over network 230 to generate passage index 216. Upon analyzing passage index 216, passage analyzer 218 may generate passage result 220 of the passage search. Passage result 220 may be processed by a natural language understanding (NLU) engine 222 to generate a response 224 from information in passage result 220 to answer question 202.

In some embodiments, question 202 may be received by QA system 210 in a natural language format. Question analysis engine 204 may parse question 202 to generate search query 206 to search a passage index. Question analysis engine 204 may process question 202 using NLU algorithms to decompose it into a form that can be used to search a passage index. For example, question analysis engine 204 may convert question 202 into a logical operation containing search keywords present in question 202. Conversion of a natural language question into a logical operation may enable a passage analyzer to search a passage index efficiently to identify the relevant passage that contains information related to the passage search query. For example, a passage analyzer or any other suitable document keyword searching tool may be able to more effectively search a document, a passage, or a passage index using a search query such as question 202 that is in the form of a logical operation than in the form of a natural language input.

In some embodiments, question analysis engine 204 may be in communication with knowledge base 212 or another database (not shown in FIG. 2) over network 230 to obtain concept identifiers and intent identifiers that may be added to search query 206. For example, knowledge base 212 or another database may flag certain concepts from the documents present in knowledge 212 and may have associated a unique identifier for such concepts that may be used uniformly across any system using knowledge base 212. If knowledge base 212 is a closed domain of knowledge, knowledge base 212 or the other database may include concept identifiers for certain keywords common to that knowledge base 212. Concept identifiers may refer to a particular word, phrase, or concept mentioned in knowledge base 212 and accordingly may tag portions of a passage with references to concepts to being discussed in the corresponding passage portions for future reference, especially during a passage search. Concept identifiers may be used by question analysis engine 204, passage analyzer 218, document preprocessing engine 214, passage index 216 to maintain uniformity in the reference format of concept identifiers across several different architectural components of QA system 210. Question analysis engine 204 may include synonyms, concept identifiers, and intent identifiers in search query 206 to perform an effective passage search to identify the best passage that identifies the information needed to answer question 202. Question analysis engine 204 may further process the intent of a natural language question 202 and tag the question with intent identifiers. Question analysis engine 204 may determine which concept identifiers and synonyms may need to be included in search query 206 by analyzing the intent of the message and correlating such information with knowledge base 212 to determine the correct identifiers to include into search query 206.

As an example, a user may enter the phrase "What drugs can be used to treat hyperthyroidism" as question 202 into QA system 210. Question analysis engine 204 may process such an input question 202 and determine that the intent of the question is to seek treatment for hyperthyroidism. Question analysis engine 204 may identify the concept identifier for hyperthyroidism and may use that to generate top level concept identifiers. For example, because question analysis engine 204 has determined that the intent of question 202 containing the keyword 'hyperthyroidism' is to seek a treatment, question analysis engine 204 may include known synonyms of the keyword 'hyperthyroidism' such as 'overactive thyroid' and may also include concept identifiers for the terms drugs, chemicals, and food (t200 OR t103 OR t168) (e.g., known treatment forms). Question analysis engine 204 may output, as search query 206, "(treatment OR medication OR first line OR second line OR use) AND (hyperthyroidism OR Overactive Thyroid) AND (t200 OR t103 OR t168)." Once question analysis engine 204 has generated search query 204, passage analyzer 218 may use the logical search string of search query 204 to search passage index 216 to determine which passage best matches the search query 204.

In some embodiments, document preprocessing engine 214 may use knowledge base 212 in generating passage index 216. Document preprocessing engine 214 may identify which documents in knowledge base 212 are available for indexing. Document preprocessing engine 214, as well as the rest of QA system 210, may be located on a device remotely located from knowledge base 212. Accordingly, document preprocessing engine 214 may scan documents 212a, 212b, and 212n for indexing by communicating with such documents located in knowledge base 212 over network 230. Alternatively, document preprocessing algorithm may retrieve any metadata or annotation files associated with documents in knowledge base 212 over network 230 to QA system 210. In another embodiment, document preprocessing engine 214 may retrieve documents identified for the passage search by QA system 210 over network 230. For example, the document preprocessing engine 214 may retrieve documents from an external knowledge base to QA system 200.

Once document preprocessing engine 214 has established access to documents in knowledge base 212, document preprocessing engine 214 may parse these documents according to a predefined algorithm, hereinafter referred to as a document preprocessing specification. The document preprocessing engine 214 may parse through plain text documents, rich text documents, markup language documents, spreadsheet documents, tables, ASCII text, or similarly encoded or encrypted documents to identify passage text and other document text such as titles, section headings, footnotes, comments etc. The document preprocessing engine 214 may use the document preprocessing specification to extract such text from a variety of differently formatted document files and create a uniformly formatted passage index that identifies the different subcomponents of each document (e.g., passage text, titles, section headings, footnotes, comments etc.). The document preprocessing specification may specify how to find annotations for each type of document text. For example, the document preprocessing specification may identify how to annotate text parsed from a cell of a spreadsheet document by identifying related cells, relationships with other cells through equations involving the given cell, table headings, document titles, graphs using information present in the given cell and other related details for the given cell. The document preprocessing specification may also specify to document preprocessing engine 214 which actions to perform when encountering the various types of text in the document (e.g., passage text, titles, section headings, footnotes, comments etc.).

In some embodiments, document preprocessing engine 214 may parse through documents from knowledge base 212 to generate a single passage index (not shown in FIG. 2) that includes annotated text from each of the parsed documents. Each passage index entry may identify the source document of the particular portion of a passage described by that passage index entry. In another embodiment, document preprocessing engine 214 may parse through documents from knowledge base 212 to generate multiple passage indices each of which corresponds to one of documents 212a, 212b, . . . 212n in knowledge base 212. Passage analyzer 218 may search through each of these passage indices when conducting a passage search. Passage analyzer may identify the source document of each annotated passage text by identifying the passage index it is analyzing. The generation of passage index 216 is described in greater detail below with relation to FIG. 3.

In some embodiments, document preprocessing engine 214 may parse documents 212a, 212b, . . . 212n to generate multiple entries describing a portion of text from the document for inclusion in passage index 216. Each entry may include text from the document and associated annotations. Document preprocessing engine 214 may generate annotations for each passage portion described in a passage index entry. By parsing through each document, document preprocessing engine 214 may include, in each passage index entry, text from section headings, document title, words from nearby passages of a corresponding document related to the portion of the passage text described in that index entry. The passage index generated by document preprocessing engine 214 may be in a format that uses the same convention for tags, concept identifiers, and other forms of annotations as other subcomponents of QA system 210. The structure and subcomponents of annotated passage index files 216 are described in greater detail below with relation to FIG. 4.

In some embodiments, document processing engine 214 may parse through each document of the set of documents in knowledge base 212 to generate sets of annotations per document. Such annotations may include text from section headings, document title, concept identifiers for subjects discussed in the passage. Document preprocessing engine 214 may automatically include each of these identified annotations to each passage index entry corresponding to the document passage that these sets of annotations describe.

Passage analyzer 218 may identify a set of documents from knowledge base 212 on which to conduct a passage search. Passage analyzer 218 may analyze metadata or annotations describing documents in knowledge base 212 to identify which documents should be included in the passage search. For example, passage analyzer 218 may monitor passage index 216 to determine that document 212a includes identifiers and/or document text that matches the field of search of search query 206. Accordingly, passage analyzer 218 may include document 212a from knowledge base 212 to a list of documents on which the passage search will be performed and may accordingly add corresponding passage index 216 entries for document 212a to a list of passage index entries to analyze during the passage search.

In some embodiments, passage analyzer 218 may analyze passage index 216 to search for matches between terms in search query 206 and the annotated indices. Passage analyzer 218 may search through each entry in the passage index to identify which document passage or document portion best matches search keywords and the logical operation between the search keywords in search query 206. Passage analyzer may also search passage index entries for concept identifiers and intent identifiers included in search query 206 to establish a degree of confidence in its keyword search. For example, if a first passage index entry that satisfies the search query keywords and logical relationship but does not include the concept identifier included in search query 206 may be given a lower score by passage analyzer 218 than a second passage index entry that satisfies most of the search query keywords and logical relationship and also includes the concept identifier annotation included in search query 206.

In some embodiments, passage analyzer 218 may score each passage in knowledge base 212 to identify which passage should be provided as passage result 220. Passage analyzer 218 may scan the annotated entries of each passage index, using sentence and boundary markers in each entry to identify the start and end points of well-formed passages. Text from a single passage may be included in more than one passage index entry. For example, each passage index entry may include a particular phrase or a particular sentence from each paragraph along with boundary marker annotations that identify the location of the passage text with relation to the rest of the passage and annotations that identify which passage the passage text belongs to. Accordingly, passage analyzer 218 may separately score each passage index entry against a particular search query 206 and may combine the scores of multiple passage index entries for a given document passage to calculate the overall passage score of each document passage. Passage analyzer 218 may score and rank each passage based on how many of the search terms are present in the passage's index entries, either as explicit passage text keywords or as annotations associated with the passage text keywords. Passage analyzer 218 may score and rank each passage according to the degree of match and the relative rarity of matched terms.

In some embodiments, passage analyzer 218 may instruct document preprocessing engine 214 to perform natural language processing of high scoring paragraphs to identify semantic relationships. For example, once passage analyzer 218 has identified which passages have a high probability of match against search query 206 (e.g., have the highest passage score upon a first pass analysis of passage index entries against search query 206), passage analyzer 218 may instruct document preprocessing engine 214 to add semantic relationship annotations to such target paragraphs.

In some embodiments, document preprocessing engine 214 may perform such natural language processing on the highest scoring passages, upon passage analyzer 218's instructions, in order to avoid performing NLP on passages that are not deemed to be worthy candidates for passage search result. Document preprocessing engine 214 may parse the high scoring paragraphs to map semantic relations present in such paragraphs. For example, document preprocessing engine 214 may resolve anaphoric relations and record antecedents and syntactic dependencies of certain passage text keywords on other portions of the passage. Upon parsing target paragraphs with NLP techniques, document preprocessing engine 214 may supplement the passage index entries corresponding to the passage text keywords with semantic annotations. For example, document preprocessing engine 214 may identify additional concept identifiers upon processing the semantic relationships of passage text keywords to identify that a particular portion of the passage is related to a given concept or topic. By annotating concept identifiers to passage portions, the document preprocessing engine 214 may provide a uniform referencing technique that can be later used by passage analyzer 218 to identify which passages, and more specifically, which portions of passages discuss certain concepts or subjects. Document preprocessing engine 214 may be aware of a set of concepts from knowledge base 212 and question analysis engine 204 that it can add as annotations to entries in passage index 216. Similarly, document preprocessing engine 214 may also analyze the semantic relationships of high scoring passages to identify the intent of given portions of those passages. Document preprocessing engine 214 may add intent identifiers to the passage index entries based on the analyzed intent. Document preprocessing engine 214 and question analysis engine 204 may coordinate their intent identifier annotation conventions so that both document preprocessing engine 214 and question analysis engine 204 are processing semantic relationships in either passage text keywords or in questions posed to QA system 210 in the same manner.

In some embodiments, once the document preprocessing engine 214 has annotated passage index entries of the target paragraphs with semantic identifiers (e.g., concept identifiers and intent identifiers), passage analyzer 218 may rescore these passages by examining the passage index entries for these passages according to search query 206, paying special attention to matching any concept identifiers and intent identifiers present in search query 206 against those present in passage index entries. In some implementations, passage analyzer 218 may weight a semantic relation match higher than a keyword match between search query 206 and the passage index entry for a given passage. Passage analyzer 218 may score each passage by identifying which passage index entries correspond to a given paragraph and compositing the score of each of the corresponding passage index entries to calculate the overall score of a paragraph.

In some embodiments, once passage analyzer 218 has finalized the scores of each passage in documents of knowledge base 212, passage analyzer 218 may rank the passages by highest score. Passage analyzer 218 may provide either the highest scoring passage as passage result 220 or may provide a preset number of highest scoring passages as passage result 220. In some embodiments, QA system 200 may extract passages identified in passage result 220 from their source documents and display these resulting passages to the user as search results of a passage search or as search results of a question answering session. Passages may be extracted by examining the start and end of end of sentence boundaries and passage boundaries. Such information may be annotated in passage index 216. By analyzing passage index entries to identify keywords that indicate sentence and passage boundaries, passage analyzer 218 may extract all of the text of a well-formed passage instead of a passage fragment.

In some embodiments, NLU engine 222 may generate a natural language response 224 to output to a user by natural language processing the document passage(s) indicated in passage result 220 in consideration of question 202. As an example, in response to a question 220 such as "What drugs can be used to treat hyperthyroidism?" NLU engine 222 may identify document passages that describe hyperthyroidism treatment drugs and generate a natural language response 224 in a format akin to question 202 such as: "Hyperthyroidism can be treated by oragrafin (sodium ipodate)." NLU engine 222 may parse through passage result 220 and identify the portion of the passage that contains the information asked by the question in formulating natural language response 224. For example, the NLU engine 222 may identify words, concept identifiers, intent identifiers identified in search query 208 mapped from question 202 to search through passage result 220 and identify portions of the passage result 220 that contains the answer to question 202. NLU engine 222 may identify the answer to question 202 from the resulting passage by processing natural language identifiers such as syntactic dependencies, anaphoric relations, semantic relations, and antecedents in portions of the passage results 220.

Figure 3:
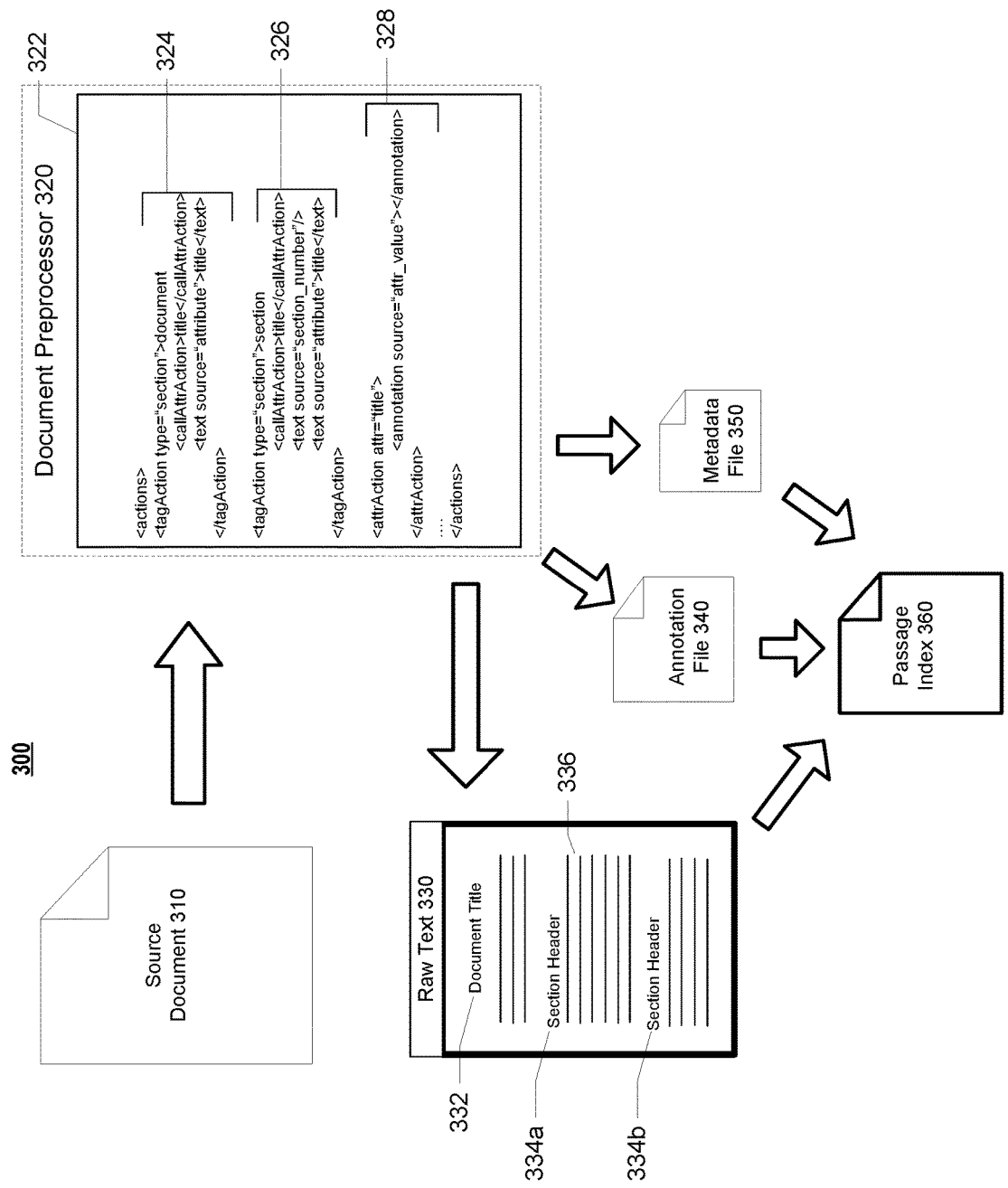
FIG. 3 depicts an illustrative diagram of the passage search system preparing a source document for future searches in accordance with one or more illustrative aspects described herein.

FIG. 3 depicts an illustrative diagram of the passage search system 300 preparing a source document 310 for future passage searches. A document preprocessor 320 corresponding to document preprocessing engine 214 of FIG. 2 may prepare a passage index 360 from a source document 310 as shown in FIG. 3. Document preprocessor 320 may parse source document 310 according to instructions in document preprocessing specification 322. In the embodiment depicted in FIG. 3, as a result of parsing the source document 310 according to instructions set in document preprocessing specification 322, document preprocessor 320 may generate a raw text file 330 containing only document text in plaintext format, annotation file 340, and metadata file 350. Document preprocessor 320 may generate passage index 360 from raw text file 330, annotation file 340, and metadata file 350. In another embodiment, as a result of parsing the source document 310 according to instructions set in document preprocessing specification 322, document preprocessor 320 may directly generate passage index 360 without generating any intermediate data files.

In some embodiments, document preprocessor 320 may parse through source document 310 and strip raw text, also referred to as passage keyword or passage text throughout this disclosure, from other document elements in source document 310 for storage in a raw text file 330. Source document 310 may contain images, markup language, computer program source code, and other elements in addition to passage text that that are not to be indexed for the passage search in a passage index. Alternatively, source document 310 may also be a well formatted text file. In some implementations, document preprocessor 320 may also strip out any portions of passage text that are not keywords. For example, document preprocessor 320 may not include pronouns, prepositions, definite and indefinite articles, conjunctions, interjections in a raw text file 330. Document preprocessor 320 may not consider these parts of speech to be valuable keywords for passage retrieval indexing and accordingly may not include them into raw text file 330. Thus, in some implementations, document preprocessor 320 may only select nouns, verbs, adjectives, and adverbs from source document 310 for inclusion as keywords in raw text file 330 and entries of passage index 360. Accordingly, raw text file 330 may only contain keywords for annotation with document context and other identifiers for passage search indexing.

In some embodiments, document preprocessor 320 may be able to parse document text from a variety of different types of source documents. Document preprocessing specification 322, used by document preprocessor 320 in parsing source document 310, may provide instructions on how to parse various types of source documents. For example, document preprocessing specification 322 may include instructions such as instructions 324, 326, and 328 that specify how to parse an xml document. In the example shown in FIG. 3, when document preprocessor 320 encounters an xml document element with the tag name 'document' in source document 310, document preprocessor 320 may perform the action associated with the attribute 'title' as well add the value of the 'title' attribute in source document 310 to raw text file 310, as instructed by document preprocessing specification 322's instruction 324. Document preprocessing specification 322 may specify that the action associated with a 'title' attribute includes adding the list of words in the title text in document source 310 to a stack of annotations in an annotation file 340. The annotations in annotation file 340 may be indexed with raw text keywords in passage index entries of passage index 360. Similarly, when document preprocessor 320 encounters an xml document element with the tag name 'section' in source document 310, document preprocessor 320 may identify and add the document title as well as the section number to annotation file 340 for indexing with raw text keywords corresponding to the section from which raw text keywords are parsed, in passage index entries of passage index 360 according to instruction 326. Instruction 324 and 326 may further use instruction 328 in their execution to extract the value of the document title from source document 310.

In some embodiments, document preprocessor 320 may extract the values of certain document elements from source document 310 to add as annotations to passage keywords in passage index 360. For example, document preprocessor 320 may extract document titles, section headings, boundary markers such as paragraph start and end points and sentence start and end points from source document 310 for inclusion in annotation file 340 upon parsing source document 310 a first time. As document preprocessor 320 parses through source document 310 for keywords to include in raw text file 330, document preprocessor 320 may extract, from source document 310, annotations such as document titles, section headings, boundary markers such as paragraph start and end points and sentence start and end points for each raw text keyword that is extracted according to instructions set forth in a predefined algorithm such as document preprocessing specification 322. Document preprocessor 320 may store such extracted annotations in an annotation file 340.

In some embodiments, document preprocessor 320 may generate a raw text file while indexing a source document for passage search. Document preprocessor 320 may generate raw text file 330 if the source document 310 does not purely contain raw text. For example, document preprocessor 320 may determine that source document 310 contains raw passage text interspersed with computer program code as in the case of a markup language source document. Upon making such a determination, document preprocessor 320 may generate a raw text file that can be used during the passage search. For example, raw text file 330 may be used to extract passages once a particular passage is identified to match a particular search query. Because raw text file 330 may contain text relevant to the search results of a passage search and may be stripped of all images, computer program source code, and any other document elements not desired in a passage search result, raw text file 330 may be used for natural language processing to identify semantic relationships in source document 310. In some implementations, raw text file 330 may be generated to include document title 332 and section headers 334*a* and 334*b* in a format that allows the document preprocessor 320 to quickly identify and retrieve the text from titles and sections headers for annotations. For example, document preprocessor 320 may parse through source document 310 and may determine, for each document text in source document 310, whether the document text is part of a document title, section header, or passage text. Upon making such a determination, document preprocessor 320 may extract the document text and format it either as document title 332, section header 334*a* or 334*b*, or passage text 336 in raw text document 330. By parsing various different types of documents and generating raw text documents from them, document preprocessor 320 may generate a uniformly formatted body of documents that is easily searchable, indexed, and from which document text can be easily referenced and extracted by a passage indexing method.

In some embodiments, document preprocessor 320 may generate an annotation file 340 while indexing a source document for passage search. Document preprocessor 320 may parse either source document 310 or a raw text document 330, generated from source document 310, to generate annotations to be associated with passage text keywords. For example, while parsing a passage keyword or a portion of a passage, document preprocessor 320 may identify the section header and document title associated with that passage text keyword, extract text from the identified section header and/or document title and store an association between the extracted annotation text and the passage text keyword in annotation file 340. Similarly, document preprocessor 320 may generate annotations for boundary markers such as paragraph start and end points and sentence start and end points by identifying passage text keywords which are at the beginning or end of a paragraph or sentence and store such association for these keywords in annotation file 340. Document preprocessor 320 may generate different entries in the annotation file 340 for each passage text keyword in source document 310, and may determine and store annotations for each passage text keyword in the appropriate entry associated with a corresponding keyword. For each keyword identified for annotation from source document 310, according to a document structure parsing algorithm specified in document preprocessing specification 322, document preprocessor 320 may identify all the annotations for that keyword and store them in annotation file 340 in a passage index entry corresponding to that keyword before moving on to parse the next passage text keyword in source document 310.

In some embodiments, document preprocessor 320 may extract individual sentences from source document 310 to generate sentence based passage indices. For example, document preprocessor 320 may parse through source document 310 and generate multiple sentence based passage indices such that each sentence index includes a single sentence of passage text from source document 310 along with annotations that document preprocessor 320 has identified for the keywords in the given sentence corresponding to each sentence based passage index. Document preprocessor 320 may generate annotations for each sentence to represent the wider document context in which each individual sentence of a sentence based passage index occurs. For example, document preprocessor 320 may annotate each sentence of a source document with a unique sentence identifier that notes the location of the sentence within source document 310, in addition to annotating the keywords in the sentence with sentence and paragraph boundary markers, title, and section heading annotations. Indexing individual sentences into sentence based passage indices may allow for index postings to be used to directly retrieve sentence identifiers without having to examine the contents of each sentence. For example, a passage analyzer may be able to search and retrieve a particular sentence as a passage search result by searching the annotations describing the sentence as a whole without having to perform a detailed search of each of the keywords of each sentence.

In another embodiment, document preprocessor 320 may generate a single sentence based passage index including entries for each sentence of each source document. For example, document preprocessor 320 may parse through source document 310 and generate multiple sentence based passage index entries such that each sentence index entry includes a single sentence of passage text from source document 310 along with annotations that document preprocessor 320 has identified for the keywords in the given sentence corresponding to each sentence based passage index entry. Document preprocessor 320 may annotate each sentence of a source document with a unique sentence identifier that notes the location of the sentence within source document 310, in addition to annotating the keywords in the sentence with sentence and paragraph boundary markers, title, and section heading annotations. Each annotation for a keyword found in the sentence may be added to the sentence based passage index entry.

In some embodiments, document preprocessor 320 may identify and include metadata related to passage keywords in a metadata file 350. Metadata file 350 may include unindexed information associated with portions of source document 310 such as syntactic dependencies and semantic representations of each sentence. For each sentence based document, document preprocessor 320 may generate semantic metadata for each sentence upon processing the semantic relations of source document 310. For example, source document 310 may be further processed using natural language algorithms to analyze the semantic relationships between keywords in each sentence, between keywords across different sentences, and to analyze semantic relations and dependencies of different sentences to each other. Such metadata may be used to guide further processing of the passage for question answering or other natural language tasks. For example, during a passage search, a passage analyzer may search the passage index (including sentence based indices) using search queries. The passage analyzer may also search through metadata file 350 to better understand the semantic relationships between different portions of the passage corresponding to the keyword entries in the passage index. By searching through metadata file 350, passage analyzer may process the relationships between the different entries of the passage index to the passage. Metadata file 350 may also contain a shared body of knowledge that QA system 300 has learnt by parsing through different source documents. For example, metadata file 350 may include a list of concepts and intents associated with concept identifiers and intent identifiers that document preprocessor 320 may include in a keyword entry of a passage index. Such a list of concept identifiers and intent identifiers may be assembled as document preprocessor 320 parses through multiple source documents on related topics. Metadata file 350 may also contain additional metadata describing the author, publisher, data of publication, and the format of each source document 310. Such additional metadata may also include the name and volume number of the publication in which source document 310 may have been originally published. The document preprocessor may identify such additional metadata while indexing source documents 310. The document preprocessor may store such additional metadata in metadata file 350. The passage analyzer may search through such additional metadata stored in metadata file 350 to identify which source documents are more likely to contain the desired information based on the search keywords in the search query. Accordingly, the passage analyzer may search through the identified source documents first.

Passage index 360 may be generated from raw text 330, annotation file 340, and metadata file 350. Document preprocessor 320 may generate each entry in passage index 360 by first parsing through the passage text keywords 336 in raw text 330. For every passage keyword, passage keyword phrase, or sentence in raw text 330, document preprocessor 320 may generate an entry in passage index 360. Document preprocessor 320 may retrieve the annotations associated with the relevant passage keyword, passage keyword phrase, or sentence from annotation file 340 and include such retrieved annotations in the appropriate entry in passage index 360. Document preprocessor 320 may supplement passage index entries with relevant metadata from metadata file 350 to associate document specific, passage specific, and keyword specific metadata with the appropriate keyword in a corresponding entry in passage index 360.

In some embodiments, passage index 360 may be generated directly from source document 310. Document preprocessor 320 may simultaneously extract passage text from source document 310 and place them in different entries of document 360, analyze these extracted passage keywords to generate annotations and store these annotations in an entry along with the extract passage keywords in passage index 360. For example, the document preprocessor 320 may parse a source document 310 using a document structure parsing algorithm as defined in document preprocessing specification 322 to identify keywords from source document 310 to place in entries of the passage index 360. Document preprocessor 320 may also identify the relevant annotations for each of these keywords, as described above, and store such identified annotations in entries of corresponding keywords in the passage index 360. Document preprocessor 320 may also identify metadata for each source document 310 and include such metadata in entries for one or more corresponding keywords in the passage index 360. Upon performing an initial search of passage index 360, passage analyzer may instruct document preprocessor 320 to annotate entries of passage index 360 with natural language identifiers (e.g., concept identifiers, intent identifiers etc.) if passage index 360 meets or exceeds a predetermined score after the initial passage search.

In some embodiments, passage keywords in passage index 360 may be annotated with text from non-proximal locations in source document to the passage keywords. For example, document preprocessor 320 may add text from the title and section headings corresponding to each passage keyword in the appropriate passage index entry. In addition, document preprocessor 320 may also identify related passage text similar to a passage text of a particular keyword entry for inclusion in the particular keyword entry. Document preprocessor 320 may identify that passage text from non-proximal locations in source document 310 may be related by searching through the document context that may be included in metadata file 350 while building passage index 360. Document preprocessor 320 may also identify related passage text from non-proximal source document locations by identifying that the annotations shared between the keyword entries of the given keyword and a different keyword have a high degree of match. Upon identifying such related keywords, document preprocessor 320 may annotate the given keyword entry of passage index 360 with such related keywords and their associated annotations (e.g., concept identifiers). By including additional passage text keywords as annotations for a given keyword, document preprocessor 320 may improve the passage search process because the passage with the most relevant answer may not contain the exact keywords in the search query. Associating other keywords related to such passage text portions, often from non-proximal locations in the source document, increases the chances of maximizing the most accurate passage search results.

As an example, the question "What are the treatments for metabolic acidosis?" may be input into QA system 300. The search query, generated from the input question, may include terms such as 'treatment', 'metabolic', and 'acidosis.' The correct answer is found in the target sentence 'A solution of sodium bicarbonate can be administered' which is located in source document titled 'metabolic acidosis' in a subsection on treatments. However, such a sentence does not contain any of the search query keywords of 'treatment', 'metabolic', and 'acidosis' and may not be returned as the search result of conventional document search engines. However, because document preprocessor 320 annotates passage text keywords with text from document title, section headings, and related passage text, document preprocessor 320 may include the words 'treatment', 'metabolic', and 'acidosis' as annotations in the one or more keyword entries corresponding to the target sentence in passage index 360 as a result of including text from section headings and document titles for each passage index entry. The passage result score for the target may be further improved upon natural language processing of the target sentence, which may further associate semantic relationships between the target sentence and the rest of the document.

In some embodiments, a passage analyzer may perform a first pass search through passage index 360 to identify whether the source document 310 corresponding to passage index 360 meets the requirements of passage search to be considered a candidate for inclusion in passage search results. For example, the passage analyzer may assign a score to a document upon searching through the entries in passage index 360 using a search query. If the passage index's score is above a predetermined threshold, the passage analyzer may instruct document preprocessor 320 to perform natural language processing on source document 310 to further improve passage search results. Upon performing natural language processing on source document 310, document preprocessor 320 may assign concept identifiers and intent identifiers to passage text entries in passage index 360 by consulting a list of concept identifiers and intent identifiers stored in metadata file 350 and determining which concept identifiers and intent identifiers best match the one or more passage keywords in an entry of passage index 360 using the results of the natural language processing.

In some embodiments, a passage analyzer may execute a passage search by simultaneously searching through passage index 360, whether generated directly or indirectly from source document 310, along with metadata file 350. For each passage index entry that document preprocessor 320 parses through, the passage analyzer may search through metadata file 350 to identify how the keywords in the given passage index entry relate to the rest of the document by analyzing the document context that may be found in metadata file 350 for portions of the passage text.

In some embodiments, document preprocessor 320 may parse spreadsheet and source documents containing tables to generate passage index 360. Document preprocessor 320 may annotate individual cells within a table or a spreadsheet with the document title, column and row titles, and information from related cells. Document preprocessor 320 may include such annotations and the text from each cell of the spreadsheet or table into a unique passage index entry. QA system 300 may generate passage index entries without making any assumptions about whether the columns and rows form a tree-like structure or a graph like structure for these words to be included in passage index 360.

FIG. 4 depicts an illustrative diagram of the annotated contents of a passage index 400 used in a passage search. Passage index 400 may include multiple entries such as the one depicted in FIG. 4. The passage index entry shown in FIG. 4 includes a keyword 402 and annotations 404, 406, 408, 410, 412a, 412b, 412c, 414a, 414b, 414c, 414d, 416a, 416b, and 418 which are related to keyword 402. A document preprocessor such as document preprocessor 320 of FIG. 3 may generate passage index 400 from a source document for use in a passage search. A passage analyzer such as passage analyzer 218 of FIG. 2 may search through entries of passage index 400 to determine which passage text of a source document best matches an input search query. In one embodiment, each entry in passage index 400 may only include one passage text keyword and its associated annotations. In another embodiment, each entry in passage index 400 may only include one or more passage text keywords and annotations associated with all the keywords included in the entry. Passage index may include the location of keyword 402 in the source document as annotation 404 for a passage analyzer to easily find and retrieve keyword 402 from the source document.

In some embodiments, each keyword in a passage index entry may be annotated with text from corresponding document title and section headings. For example, in passage index 400, keyword 402 may be annotated with text 412a, 412b, and 412c from the title of the document in which keyword 402 is located. Similarly, keyword 402 may be annotated with text 414a, 414b, 414c, and 414d from the section heading and subheadings corresponding to passage text keyword 402. Passage index entries may be annotated with one or more section headings corresponding to passage keywords. For example, if a passage text keyword 402 is located in a passage associated with a section heading and further subheadings, text from the section heading and the subheadings are all included in the passage index entry describing passage text keyword 402. In the example show in FIG. 4, keyword 402 'infections' may be located in a document titled 'abnormal cervical dysplasia' in a section with a heading 'main topic' within a subsection with a subheading 'basics' and further within an even deeper subsection with the subheading 'description.' Accordingly, passage index 400 captures text from the document titles, section headings and subheadings for passage keyword 402, as annotations 412a, 412b, 412c, 414a, 414b, 414c, and 414d. Passage index 400 may also capture the hierarchical relationship between the section heading and section subheadings as annotation 418 for a passage analyzer to identify with ease the structure of the source document and the exact location within the source document in which passage keyword 402 is located.

Keywords in passage index 400 may be marked with sentence and fragment boundaries. The document preprocessor may determine words that lie at passage boundaries and at sentence boundaries (e.g., the first and the last keyword in a passage and in a passage sentence, respectively) and may include annotations denoting that the keyword is at the passage and/or section boundary. For example, keyword 402 may be the first passage text keyword in a new passage. Accordingly, keyword 402 is associated with sentence boundary annotation 416a marking that keyword 402 is the first keyword in a new sentence and fragment boundary annotation 416b marking that keyword 402 is the first keyword in the new passage. Sentence boundary and fragment boundary annotations may be used by the passage analyzer in determining which passage text keywords to extract a clean self-contained passage fragment as a passage search result.

In some embodiments, keywords in passage index 400 may be annotated with concept identifiers and intent identifiers. Keyword 402 may be indexed with concept identifier 406 and intent identifier 410. Concept identifier 406 and intent identifier 410 may be added to passage index 400 after the source document has been natural language processed to identify semantic relationships between its passage text keywords. Intent identifiers may be identified from examining such sematic relationships and identifying the purpose or intent of each sentence. Intent identifiers may provide additional information as to the usage of each passage text keyword such as keyword 402 in the context of the whole source document. Concept identifiers may be used to identify the topic or concept that the keyword is describing. Concept identifiers may be identified by examining other passage text surrounding keyword 402 and their semantic relationships with keyword 402.

In some embodiments, concept identifiers may also be noted for words from title and section headings (not shown in FIG. 4). Document title annotations 412a, 412b, and 412c and section heading annotations 414 may include concept identifiers for the words in these titles. By including concept identifiers for document title and section heading annotations to passage index 400, a document preprocessor may allow a passage analyzer to be able to identify keyword 402 as a possible search result even though none of the exact words in document title annotations 412a, 412b, and 412c and section heading annotations 414a, 414b, 414c, and 414d may be included in the search query. However if the search query includes search keywords that are either synonyms or reference the same concepts as the document title or a section heading, the passage analyzer may be able to return keyword 402 as a possible match by identifying that the concept identifiers for the document title or section heading annotations match the search query.

In some embodiments, passage index entries may be scored by passage analyzer upon performing at least one pass of a passage search using a search query. Passage index 400 may be annotated with the score. For example, a passage analyzer may store confidence intervals for each annotation based on the degree of match between the given annotation and the search query. For example, a confidence score 408 may be associated with concept identifier 406. Confidence score 408 may indicate the degree of match that concept identifier 406 may have with one or more search keywords of the search query. Accordingly, different types of annotations may be scored and assigned confidence scores based on their degree of match with the search terms. By assigning such confidence scores to annotations in passage index entries, passage analyzer may be able to calculate the score of each passage index entry and evaluate the one or more passage text keywords associated with the scored passage index entry for inclusion in passage search results.

Figure 5:
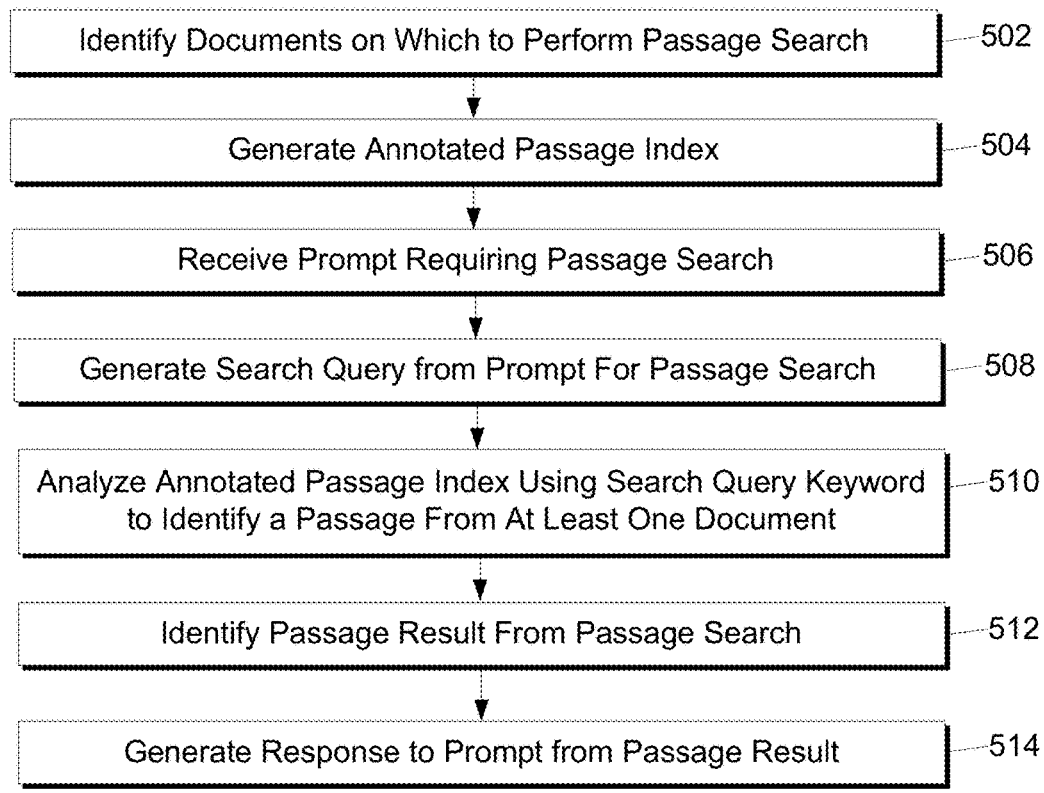
FIG. 5 depicts a flowchart that illustrates a method for searching passages by which a QA system generates responses to input prompts in accordance with one or more illustrative aspects described herein.

FIG. 5 depicts an illustrative method 500 for searching passages by which a QA system generates responses to input prompts in accordance with one or more embodiments. In one or more embodiments, method 500 of FIG. 5 and/or one or more steps thereof may be performed by a QA system running on a computing device (e.g., client computing devices 107 and 109 or data server 103). In other embodiments, method 500 illustrated in FIG. 5 and/or one or more steps thereof may be embodied in computer-executable instructions that are stored in a computer-readable medium, such as a non-transitory computer-readable memory.

As seen in FIG. 5, the method may begin at step 502 in which the computing device identifies documents on which to perform passage searches. The computing device may identify which source documents it has access to for performing a passage search. For example, the computing device may identify all the source documents in databases that it has access to. Alternatively or additionally, the computing device may identify all databases and knowledge bases that it has access to. The computing device may also identify which Internet domains and subdomains and/or local networks it can access. In an embodiment, if the passage search engine is specialized to a specific field (e.g., genome search, medical information search, etc.), the computing device may identify databases on the Internet and/or local networks that include documents for such specific fields and limit the passage search to those specific databases in order to avoid searching through the entire Internet and/or network databases that will likely not yield much more relevant information than the identified specified databases. Once such Internet domains and/or network databases to be searched have been identified, the computing device may crawl through documents or web pages in these databases and/or Internet domains and create a passage index with passage index entries for such documents and/or web pages.

In step 504, the computing device may generate an annotated passage index. The computing device may generate one composite passage index and add entries to the composite passage index as it crawls through different documents and/or web pages. Alternatively, the computing device may generate one or more passage indices per document and/or web page. A document preprocessor of the computing device may generate keyword entries in such a passage index by creating entries for keywords found in a passage of the document and/or web page. The document preprocessor may identify which words of a document and/or web page are keywords and which words from the document and/or web page to not include in the passage index according to a document structure parsing algorithm. The computing device may generate an annotated passage index by creating intermediate files such as annotation files and metadata files or it may generate the annotated passage index directly by parsing through the source documents and/or web pages. The computing device may add section headings and document titles corresponding to each keyword in the corresponding passage index entry of the passage index. The computing device may also identify concept identifiers and intent identifiers upon parsing the source document and/or web page and may add such concept identifiers and intent identifiers to the appropriate entries in the passage index. Once an annotate passage index has been generated, it can be searched during subsequent passage searches requested by the user.

In step 506, the computing device may receive a prompt requiring passage search to be performed. For example, a search string may be received from a user requesting information as a result of a passage search. The search string may be in a natural language format in the form of a question. Alternatively, the received search string may be a collection of search keywords. The search prompt may be received as text or as a voice command. If the prompt is received as a voice command, the computing device may convert the audio input into text using speech recognition techniques.

In step 508, the computing device may generate a search query from the received prompt for passage search. The computing device may normalize all received prompts into a search query composed of logical operators, search keywords, concept identifiers in a format that is used to conduct passage searches by the QA system. For example, the received prompt may be transformed into a search prompt in a normalized format the QA system, especially the passage analyzer, is equipped to handle. For example, the QA system may perform natural language processing on the received prompt to generate a QA system compatible search query by parsing the search keywords and inserting logical operators, concept identifiers and intent identifiers identified from the context of the prompt during the natural language processing.

In step 510, the computing device may analyze the annotated passage index using a search query keyword to identify a passage from at least one document. The computing device, using a passage analyzer, may search through the one or more passage index entries for all the documents and/or web pages identified for the passage search. The passage analyzer may use the search keywords in analyzing passage index entries for matches between one or more of the search keywords, logical relationship in the search keywords, concept identifiers, and intent identifiers in the search query and the annotations and keyword in the passage index entries. Accordingly, the passage analyzer may score each passage of the plurality of documents and/or web pages based on the number of matches between the search query terms and the information in the passage index entries for the corresponding passage. The passage analyzer may composite the score of all the passage index entries for all the keywords corresponding to a particular passage to generate the composite score of any given passage that has multiple keywords and accordingly multiple passage index entries.

In step 512, the computing device may identify at least one passage from the results of the passage search. The highest scoring passage or a plurality of the highest scoring passages may be identified as the results of the passage search. For example, the passage analyzer may examiner the scores that it has assigned to each of the passages by analyzing their corresponding passage index entries. Upon examining the scores, the highest scoring passage may be selected to be presented as the result of the passage search. In some embodiments, a predetermined number of passages may be displayed as the passage result, the predetermined number being stored as a modifiable default value in the QA system. In this case, the predetermined number of passages with the highest scores assigned by the passage analyzer for a particular search query may be selected as the result of the passage search.

In step 514, the computing device may generate a response to the received prompt from passage result. Once a passage result is identified, an answer to the originally asked question that triggered the passage retrieval process may be composed in a natural language format. The answer may be composed by examining the passage search result against the prompt, identifying the information from the passage that sufficiently answers the prompt, and presenting the identified passage information to the user upon determining the most appropriate syntactical form in which to phrase the answer. For example, a NLU engine, such as NLU engine 222 of FIG. 2, may parse through the passage result and identify the portion of the passage that contains the information asked by the question in formulating the natural language response. For example, the NLU engine may identify words, concept identifiers, intent identifiers identified in the search query mapped from the prompt to search through the passage result and identify portions of the passage result that contain the answer to the prompt. The NLU engine may identify the answer to the prompt from the resulting passage by processing natural language identifiers such as syntactic dependencies, anaphoric relations, semantic relations, and antecedents in portions of the passage result.

Figure 6:
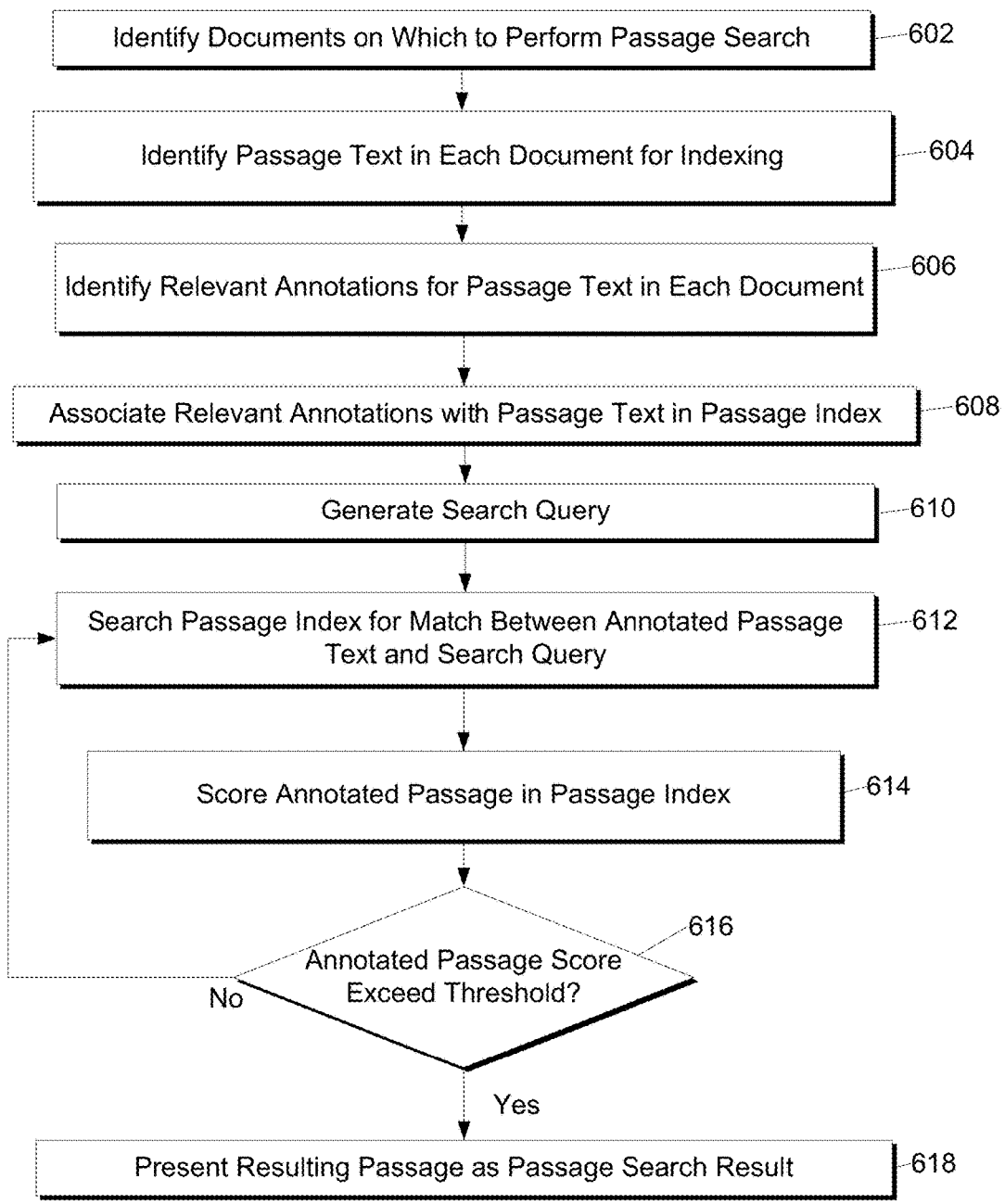
FIG. 6 depicts a flowchart that illustrates a method for searching for passages in accordance with one or more illustrative aspects described herein.

FIG. 6 depicts a flowchart that illustrates a method for searching for passages. In one or more embodiments, method 600 of FIG. 6 and/or one or more steps thereof may be performed by a QA system running on a computing device (e.g., client computing devices 107 and 109 or data server 103). In other embodiments, method 600 illustrated in FIG. 6 and/or one or more steps thereof may be embodied in computer-executable instructions that are stored in a computer-readable medium, such as a non-transitory computer-readable memory.

As seen in FIG. 6, the method may begin at step 602 in which the computing device may identify documents on which to perform the passage search. The computing device may identify which source documents it has access to for performing a passage search. For example, the computing device may identify all the source documents in databases that it has access to. Alternatively or additionally, the computing device may identify all databases and knowledge bases that it has access to. The computing device may also identify which Internet domains and subdomains and/or local networks it can access. In an embodiment, if the passage search engine is specialized to a specific field (e.g., genome search, medical information search, etc.), the computing device may identify databases on the Internet and/or local networks that include documents for such specific fields and limit the passage search to those specific databases in order to avoid searching through the entire Internet and/or network databases that will likely not yield much more relevant information than the identified specified databases. Once such Internet domains and/or network databases to be searched have been identified, the computing device may crawl through documents or web pages in these databases and/or Internet domains and create passage index entries for such documents and/or web pages.

In step 604, the computing device may identify passage text in each document for indexing. The document and/or web page may consist of passage text and additional information such as markup language program code, pictures, advertisements, hyperlinks. Such additional information may be stripped from each document and/or web page in order to generate a raw text document such as raw text 330 of FIG. 3. In another embodiment, the document preprocessor may not generate a raw text document for each source document but may strip the additional information from source documents and/or web pages for generation of passage index entries from the source document and/or web page. In addition to stripping the document and/or web page of its additional information, raw passage text may be separated from section headings, titles, and other headings to identify pure passage text. A document preprocessor, such as document preprocessor 320 of FIG. 3, may strip the source document and/or web page from its additional information and identify passage text keywords to be added to separate entries of a passage index.

In step 606, the computing device may identify relevant annotations for passage text in each document. Certain passage text and metadata identified by the document preprocessor from the source document and/or the web page may be identified as annotations for passage text keywords. For example, a document preprocessor may extract document titles, section headings, boundary markers such as paragraph start and end points and sentence start and end points from source documents and/or web pages upon parsing the source documents and/or web pages.

In step 608, the computing device may associate relevant annotations with passage text in a passage index. While parsing a passage keyword or a portion of a passage, the document preprocessor may identify the section header and document title associated with that passage text keyword, extract text from the identified section header and/or document title and store an association between the extracted annotation text and the passage text keyword. Similarly, the document preprocessor may generate annotations for boundary markers such as paragraph start and end points and sentence start and end points by identifying passage text keywords which are at the beginning or end of a paragraph or sentence and store such association in the passage index. The document preprocessor may store annotations associated with each passage text keyword in the appropriate entry in a passage index associated with a corresponding keyword.

In step 610, the computing device may generate a search query. For example, a question analysis engine, such as question analysis engine 204 of FIG. 2, may convert a prompt received to initiate the passage search into a search query. The question analysis engine may process the received prompt using NLU algorithms to decompose it into a form that can be used to search a passage index. For example, the question analysis engine may convert the prompt into a logical operation containing search keywords present in the prompt. Conversion of a natural language question into a logical operation may enable a passage analyzer to search a passage index efficiently to identify the relevant passage that contains information related to the passage search query. For example, a passage analyzer or any other suitable document keyword searching tool may be able to more effectively search a document, a passage, or a passage index using a search query that is in the form of a logical operation than in the form of a natural language input. Concept identifiers may be used by the QA system to maintain uniformity in the reference format of concept identifiers across several different architectural components of QA system 210. Synonyms of search keywords, concept identifiers, and intent identifiers may be included in the search query. The question analysis engine may further process the intent of a natural language prompt and tag the search query with intent identifiers.

In step 612, the computing device may search a passage index for match between annotated passage text and the search query. The computing device, using a passage analyzer, may search through the one or more passage index entries for all the documents and/or web pages identified for the passage search. The passage analyzer may use the search query in analyzing passage index entries for matches between one or more of the search keywords, logical relationship in the search keywords, concept identifiers, and intent identifiers in the search query and the annotations and keyword in the passage index entries.

In step 614, the computing device may score the annotated passage in the passage index. For example, the passage analyzer may score each passage of the plurality of documents and/or web pages based on the number of matches between the search query terms and the information in the passage index entries for the corresponding passage. The passage analyzer may composite the score of all the passage index entries for all the keywords corresponding to a particular passage to generate the composite score of any given passage that has multiple keywords and accordingly multiple passage index entries. The passage analyzer may identify the whole passage using fragment boundaries to calculate the score of passage by examining score of multiple passage index entries for that passage. For example, the passage analyzer may identify the boundary of a passage and accordingly composite the scores for each passage index entries for passage text keywords that fall within the identified passage boundaries to calculate a composite passage score.

In step 616, the computing device may determine whether the annotated passage score exceeds a predetermined threshold. A predetermined threshold score may be used in evaluating whether a passage matches the search query to a degree that merits presenting it as a passage result. For example, once or more passage index entries corresponding to a passage have been searched with respect to the search query and scored, the passage analyzer may evaluate whether the composite score of a passage exceeds the predetermined score. Such a predetermined score threshold may be modified by the administrator of the QA system or even by the user. Such control may allow the user to have control over the tradeoff between how many passage results are presented and the overall accuracy of match between the passages and the search query. If the computing device determines that the passage score does not exceed the predetermined threshold, the method may return to step 612 to search a passage index for another match between annotated passage text and the search string. The passage analyzer may continue to search through all of the passages of the source documents and/or web pages identified in step 602.

In response to determining that the passage score exceeds the predetermined threshold, in step 618, the computing device may present the resulting passage or passages of the passage search as the passage search result. The passage analyzer may identify the corresponding passage from the source document and extract the well-formed passage by using the boundary fragments from passage index entries that denote passage boundaries. For example, the passage analyzer may examine the passage index entries associated with the identified passage result to identify the first and last words in each passage (e.g., the passage boundaries). Upon identifying the passage boundaries, the passage analyzer may extract a well formed passage by extracting all of the passage text from the source document and/or web page that lies within the identified passage boundaries.

Figure 7:
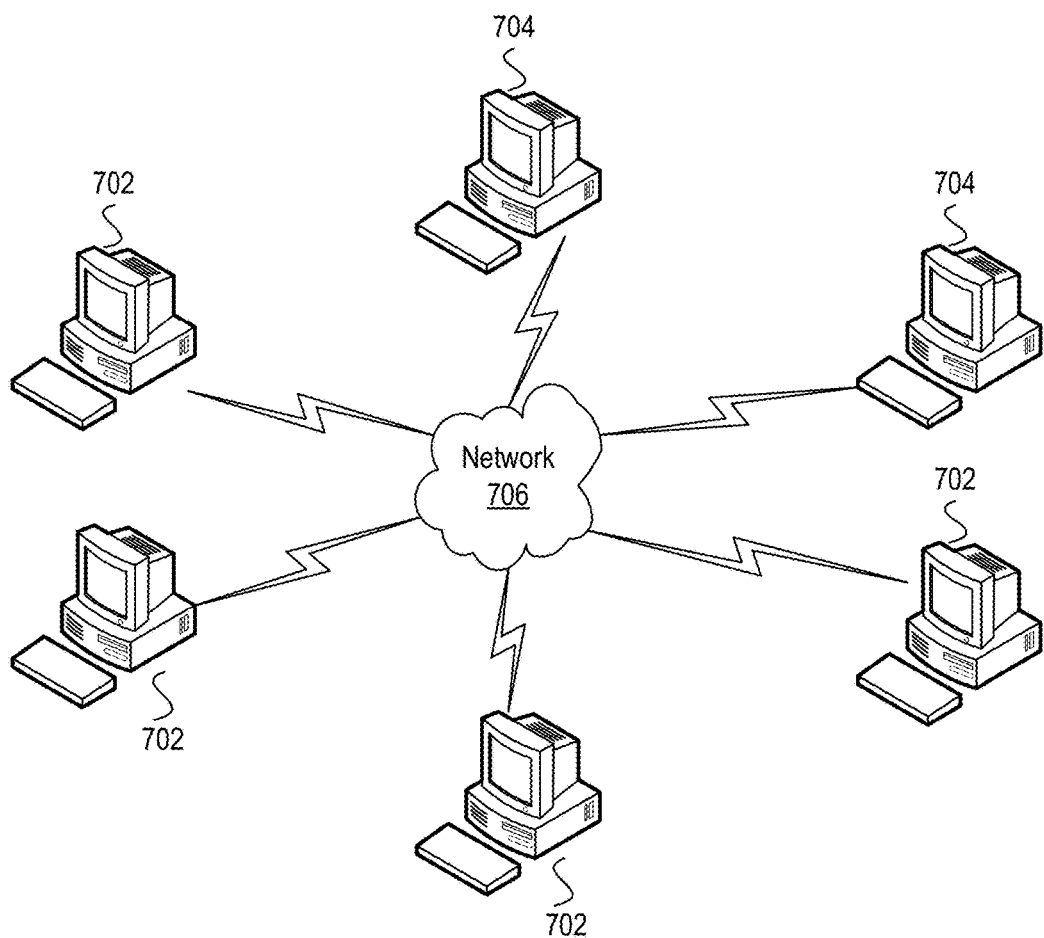
FIG. 7 depicts an illustrative computing environment in which one or more illustrative aspects described herein may be implemented.

In FIG. 7, an example of an implementation of a computing environment 700 in which aspects of the present disclosure may be implemented is shown. Client computing devices 702 and server computing devices 704 provide processing, storage, and input/output devices executing application programs and the like. Client computing devices 702 may include, e.g., desktop computers, laptop computers, tablet computers, palmtop computers, smartphones, smart televisions, and the like. Client computing devices 702 can also be linked through communications network 706 to other computing devices, including other client devices computing devices 702 and server computing devices 704. Communications network 506 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

One or more embodiments may be implemented in any conventional computer programming language. For example, embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

A described "process" is the performance of a described function in a computer using computer hardware (such as a processor, domain-programmable gate array, or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "process" does not necessarily imply a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method for indexing document passages, the method comprising:

identifying, by a computing device, a plurality of documents, wherein each document of the plurality of documents comprises a plurality of passages;

generating, by the computing device and by parsing each document of the plurality of documents according to a predefined document structure parsing algorithm, a passage index comprising a plurality of entries, each entry comprising: a keyword from a passage of the plurality of passages in one of the plurality of documents, at least one annotation associated with the passage, and an association between the keyword from the passage and the at least one annotation;

determining one or more intent identifiers corresponding to a question input, wherein the question input comprises a natural language input received by the computing device;

determining a search query comprising at least one search keyword corresponding to an intent identifier of the one or more intent identifiers;

assigning the one or more intent identifiers to at least one passage from the plurality of documents in the passage index;

determining which intent identifiers of the one or more intent identifiers best match the at least one search keyword in the passage index based on, at least in part, natural language processing;

using the at least one search keyword to identify the at least one passage from the plurality of documents that matches the search query;

scanning for one or more boundary markers, determined via the predefined document structure parsing algorithm and comprising the at least one annotation associated with the at least one passage, to identify a start and an end of the at least one passage;

and generating, by the computing device, and using the at least one passage, a natural language response output comprising an answer to the question input, wherein generating the natural language response output causes the answer to the question input to be presented.

2. The method of claim 1, wherein annotations in the passage index comprise text from at least one of a document title of a document corresponding to the keyword, a section heading corresponding to the keyword, context from one of the plurality of passages located proximal to the section heading, concept identifiers related to the keyword, a synonym of the keyword, a part of speech for the keyword, syntactic dependencies of the keyword, and one or more boundary markers in the document near the keyword.

3. The method of claim 1, further comprising:
searching, by the computing device, portions of the passage index for matches between an entry in the passage index and the at least one search keyword; and
scoring, by the computing device, each passage of each of the plurality of documents based on a number of matches between passage index entries for a given passage and the at least one search keyword.

4. The method of claim 1, wherein the passage index comprises passage text from the passage and wherein the at least one annotation is added to the passage index at an end of a portion of the passage text.

5. The method of claim 1, wherein the at least one annotation comprises text from a document located at a non-proximal location in the document relative to the keyword.

6. The method of claim 1, wherein one or more documents of the plurality of documents comprises well-formed sentences, the method further comprising:

dividing, by the computing device, each of the one or more documents comprising well-formed sentences, to generate a plurality of sentence oriented documents; and associating, by the computing device, keywords in one of the plurality of sentence oriented documents with annotations comprising information related to the keywords.

7. The method of claim 1, further comprising determining the one or more boundary markers by:

identifying, while parsing each document of the plurality of documents according to the predefined document structure parsing algorithm, keywords located at least one of: a beginning of the passage, an end of the passage, a beginning of a sentence, or the end of a sentence;

generating the at least one annotation associated with the passage, wherein the at least one annotation indicates that the keywords comprise the one or more boundary markers; and storing the at least one annotation in the passage index.

8. The method of claim 1, further comprising determining synonyms and concept identifiers corresponding to the search query.

9. The method of claim 1, wherein the intent identifiers correspond to words other than words comprising the question input.

10. The method of claim 1, wherein generating the natural language response output comprises identifying, in the at least one passage, an answer to the question input by processing one or more of syntactic dependencies, anaphoric relations, semantic relations, and antecedents in portions of the at least one passage.

11. The method of claim 1, further comprising converting the question input into a logical operation form prior to determining the one or more intent identifiers corresponding to the question input.

12. An apparatus, comprising:

at least one processor; and at least one memory storing computer-readable instructions that, when executed by the at least one processor, cause the apparatus to:

identify a plurality of documents, wherein each document of the plurality of documents comprises a plurality of passages;

generate, by parsing each document of the plurality of documents according to a predefined document structure parsing algorithm, a passage index comprising a plurality of entries, each entry comprising: a keyword from a passage of the plurality of passages in one of the plurality of documents, at least one annotation associated with the passage, and an association between the keyword from the passage and the at least one annotation;

determine one or more intent identifiers corresponding to a question input, wherein the question input comprises a natural language input received by the apparatus;

determine a search query comprising at least one search keyword corresponding to an intent identifier of the one or more intent identifiers;

assign the one or more intent identifiers to at least one passage from the plurality of documents in the passage index;

determine which intent identifiers of the one or more intent identifiers best match the at least one search keyword in the passage index based on, at least in part, natural language processing;

use the at least one search keyword to identify the at least one passage from the plurality of documents that matches the search query;

scan for one or more boundary markers, determined via the predefined document structure parsing algorithm and comprising the at least one annotation associated with the at least one passage, to identify a start and an end of the at least one passage;

and generate, using the at least one passage, a natural language response output comprising an answer to the question input, wherein generating the natural language response output causes the answer to the question input to be presented.

13. The apparatus of claim 12, wherein annotations in the passage index comprise text from at least one of a document title of a document corresponding to the keyword, a section heading corresponding to the keyword, context from one of the plurality of passages located proximal to the section heading, concept identifiers related to the keyword, a synonym of the keyword, a part of speech for the keyword, syntactic dependencies of the keyword, and one or more boundary markers in the document near the keyword.

14. The apparatus of claim 12, wherein the computer-readable instructions, when executed by the at least one processor, cause the apparatus to:

search portions of the passage index for matches between an entry in the passage index and the at least one search keyword; and score each passage of each of the plurality of documents based on a number of matches between passage index entries for a given passage and the at least one search keyword.

15. The apparatus of claim 12, wherein the passage index comprises passage text from the passage and wherein the at least one annotation is added to the passage index at an end of a portion of the passage text.

16. The apparatus of claim 12, wherein the at least one annotation comprises text from a document located at a non-proximal location in the document relative to the keyword.

17. The apparatus of claim 12, wherein one or more documents of the plurality of documents comprises well-formed sentences, and wherein the computer-readable instructions, when executed by the at least one processor, cause the apparatus to:

divide each of the one or more documents comprising well-formed sentences, to generate a plurality of sentence oriented documents; and associate keywords in one of the plurality of sentence oriented documents with annotations comprising information related to the keywords.

18. The apparatus of claim 12, wherein the computer-readable instructions, when executed by the at least one processor, cause the apparatus to:

identify, while parsing each document of the plurality of documents according to the predefined document structure parsing algorithm, keywords located at least one of: a beginning of the passage, an end of the passage, a beginning of a sentence, or the end of a sentence;

generate the at least one annotation associated with the passage, wherein the at least one annotation indicates that the keywords comprise the one or more boundary markers; and store the at least one annotation in the passage index.

19. The method of claim 8, wherein determining the search query comprises determining, based at least in part on the synonyms and concept identifiers, the search query.

20. One or more non-transitory computer-readable media storing instructions that, when executed by a computing platform comprising at least one processor, a communication interface, and memory, cause the computing platform to:
- identify a plurality of documents, wherein each document of the plurality of documents comprises a plurality of passages;
- generate, by parsing each document of the plurality of documents according to a predefined document structure parsing algorithm, a passage index comprising a plurality of entries, each entry comprising: a keyword from a passage of the plurality of passages in one of the plurality of documents, at least one annotation associated with the passage, and an association between the keyword from the passage and the at least one annotation;
- determine one or more intent identifiers corresponding to a question input, wherein the question input comprises a natural language input received by the computing platform;
- determine a search query comprising at least one search keyword corresponding to an intent identifier of the one or more intent identifiers;
- assign the one or more intent identifiers to at least one passage from the plurality of documents in the passage index;
- determine which intent identifiers of the one or more intent identifiers best match the at least one search keyword in the passage index based on, at least in part, natural language processing;
- use the at least one search keyword to identify the at least one passage from the plurality of documents that matches the search query;
- scan for one or more boundary markers, determined via the predefined document structure parsing algorithm and comprising the at least one annotation associated with the at least one passage, to identify a start and an end of the at least one passage;
- and generate, using the at least one passage, a natural language response output comprising an answer to the question input, wherein generating the natural language response output causes the answer to the question input to be presented.

* * * * *